United States Patent
Nakano

(10) Patent No.: US 6,886,948 B2
(45) Date of Patent: May 3, 2005

(54) ELECTRONICS EXTERIOR CASE AND PROJECTOR HAVING THE SAME

(75) Inventor: Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/345,355

(22) Filed: Jan. 16, 2003

(65) Prior Publication Data

US 2003/0174288 A1 Sep. 18, 2003

(30) Foreign Application Priority Data

Jan. 23, 2002 (JP) ........................................ 2002-014825

(51) Int. Cl.[7] .............................. G03B 21/14; A47F 7/00
(52) U.S. Cl. ...................................... 353/119; 211/26.1
(58) Field of Search ................................. 353/119, 122; D16/231, 235; 211/26.1; 206/701; 174/52.1; 361/807

(56) References Cited

U.S. PATENT DOCUMENTS

| | | | | |
|---|---|---|---|---|
| 5,337,103 A | * | 8/1994 | Gulick | 353/119 |
| 5,388,692 A | * | 2/1995 | Withrow et al. | 206/320 |
| 5,823,651 A | * | 10/1998 | Helot et al. | 353/119 |
| D453,158 S | * | 1/2002 | Chen | D14/374 |
| 6,525,268 B1 | * | 2/2003 | Sellers | 174/52.1 |
| 6,626,543 B2 | * | 9/2003 | Derryberry | 353/119 |

FOREIGN PATENT DOCUMENTS

JP     A 8-304739     11/1996

* cited by examiner

*Primary Examiner*—Christopher E Mahoney
(74) *Attorney, Agent, or Firm*—Oliff & Berridge, PLC

(57) ABSTRACT

A remote controller storage (26) is formed on an exterior case (2) of a projector (1) under connectors (5A) constituting an interface installed on a circuit board (5), the remote controller storage (26) having a storage body (261) for a remote controller (26A) to be accommodated and a pivotably-supported lid (262) covering the storage body (261), so that a dead space can be effectively utilized as the storage body 261 and the remote controller (26A) can be securely carried without hindering size reduction of the projector (1).

16 Claims, 13 Drawing Sheets

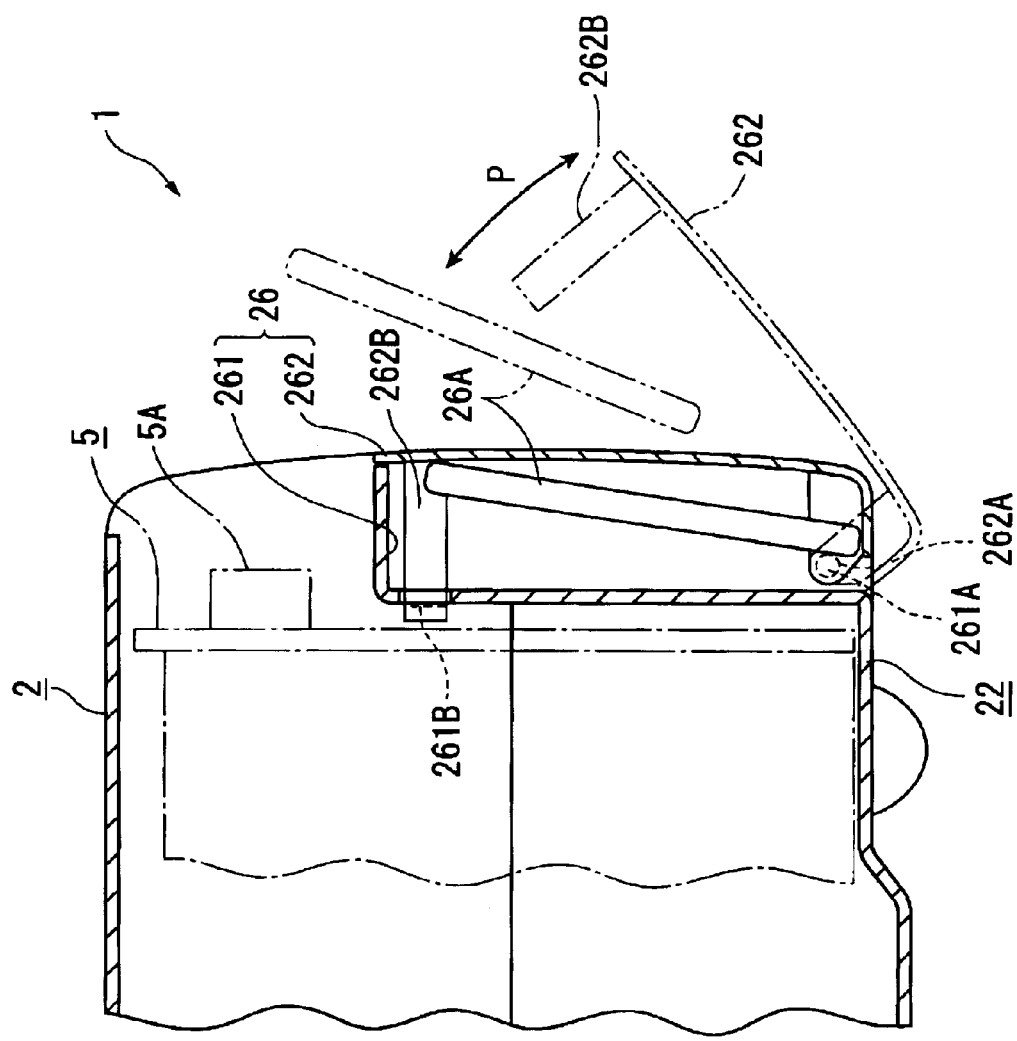

ELECTRONICS EXTERIOR CASE AND PROJECTOR HAVING THE SAME

BACKGROUND OF THE INVENTION

1. Field of the Invention

The present invention relates to an electronics exterior case and a projector having the exterior case.

2. Description of Related Art

Conventionally, so-called three-plate type projector has been known, which is provided with a dichroic mirror for separating a light beam irradiated by a light source lamp into three color lights, three liquid crystal panels for modulating each color light in accordance with image information and a cross dichroic prism for combining the light beam modulated by the respective liquid crystal panels for enhancing luminance of the projected image.

When presentation etc. is conducted using the projector, an operation panel provided on the projector body may be directly operated. However, in an ordinary case, an operator stands beside a screen apart from the projector body and remotely operates the projector using a remote controller.

Further, in recent years, a mobile type projector has been developed in response to a demand for reduction in size and weight as well as enhancing the luminance. Such mobile type projector is carried with a remote controller being annexed.

However, when such mobile type projector is carried, the remote controller is often forgotten to be carried therewith. A storage for accommodating the remote controller may be provided on the outside of an exterior case for accommodating the projector body. However, in such arrangement, the size of the projector increases, thus spoiling portability thereof.

Such problem is not restricted to a projector but also recognized in the other electronics such as game machine and camera.

SUMMARY OF THE INVENTION

An object of the present invention is to provide an electronics exterior case capable of securely carrying an accessory while enabling size reduction, and a projector having the exterior case.

An electronics exterior case according to an aspect of the present invention accommodates a body of electronics and a board provided with a controller that controls the drive of the electronics, the board having a connection terminal exposed to the outside of the electronics exterior case for external electronics to be connected and an interface that transmits and receives a signal to and from the controller, the electronics exterior case including an accessory storage capable of accommodating an accessory annexed to the body of the electronics at a position adjacent to the interface.

The accessories accommodated in the accessory storage are those annexed to a body of electronics such as a remote controller, connection cable and earphone.

The electronics for the electronics exterior case to be used are various portable electronics such as a projector, game machine and camera.

The connection terminal of the interface projects from the board to the outside so that the connection terminal is exposed to be connected with an external device. Accordingly, the space defined by the dimension of the projection has been a dead space.

According to the present invention, since the accessory storage is provided on the upper or lower side of the interface including the connection terminal in an adjacent manner, the conventional dead space can be effectively utilized as the accessory storage. Accordingly, the accessory can be securely carried by accommodating the accessory in the accessory storage.

In the electronics exterior case, the accessory storage may preferably include a lid pivotably supported by the electronics exterior case.

According to the above arrangement, when, for instance, the lid is pivotably moved relative to the electronics exterior case for opening and closing the accessory storage, the accessory can be easily stored and taken out by pivotably moving the lid to open the storage. Further, when the lid is closed, the fall-off of the accessory from the accessory storage can be prevented.

The lid may preferably be made of transparent or translucent material.

According to the above arrangement, since whether the accessory is accommodated in the accessory storage or not can be checked from the outside, it is not necessary to check the inside by pivotably moving the lid, so that the presence of the accessory can be easily confirmed, thus securely preventing the accessory from not being carried.

In the above arrangement, a hemispheric projection to be engaged with a recess formed on the electronics exterior case may preferably be formed on the lid, the lid being pivotably moved relative to the electronics exterior case by the engagement of the recess and the projection.

According to the above arrangement, the lid can be securely turned with a relatively simple structure of engaging the spherical projection formed on the lid and the projection formed on the electronics exterior case.

A projector according to another aspect of the present invention has: an optical system that modulates a light beam irradiated by a light source in accordance with image information to form an optical image, and enlarges and projects the optical image; a board installed with a controller that controls the operation of the optical system and an interface for external electronics to be connected; an accessory; and an exterior case that accommodates the optical system and the board, the exterior case having an accessory storage capable of accommodating the accessory at a position adjacent to the interface.

According to the above aspect of the present invention, the same function and effect as the above-described electronics exterior case can be obtained, thereby securely carrying the accessory annexed to a projector while enabling size reduction of the projector.

In the above projector, the accessory may preferably be a remote controller capable of transmitting a signal to the controller at a position remote from the projector.

According to the above arrangement, since the remote controller which is especially likely to be forgotten to be carried can be securely carried, so that the image can be smoothly projected by the remote operation of the remote controller.

BRIEF DESCRIPTION OF THE DRAWINGS

FIG. 13 is a vertical cross section showing a pivot movement of the remote controller storage.

DETAILED DESCRIPTION OF PREFERRED EMBODIMENT(S)

An embodiment of the present invention will be described below with reference to the attached drawings.

[1. Primary Arrangement of Projector]

Figure 1:
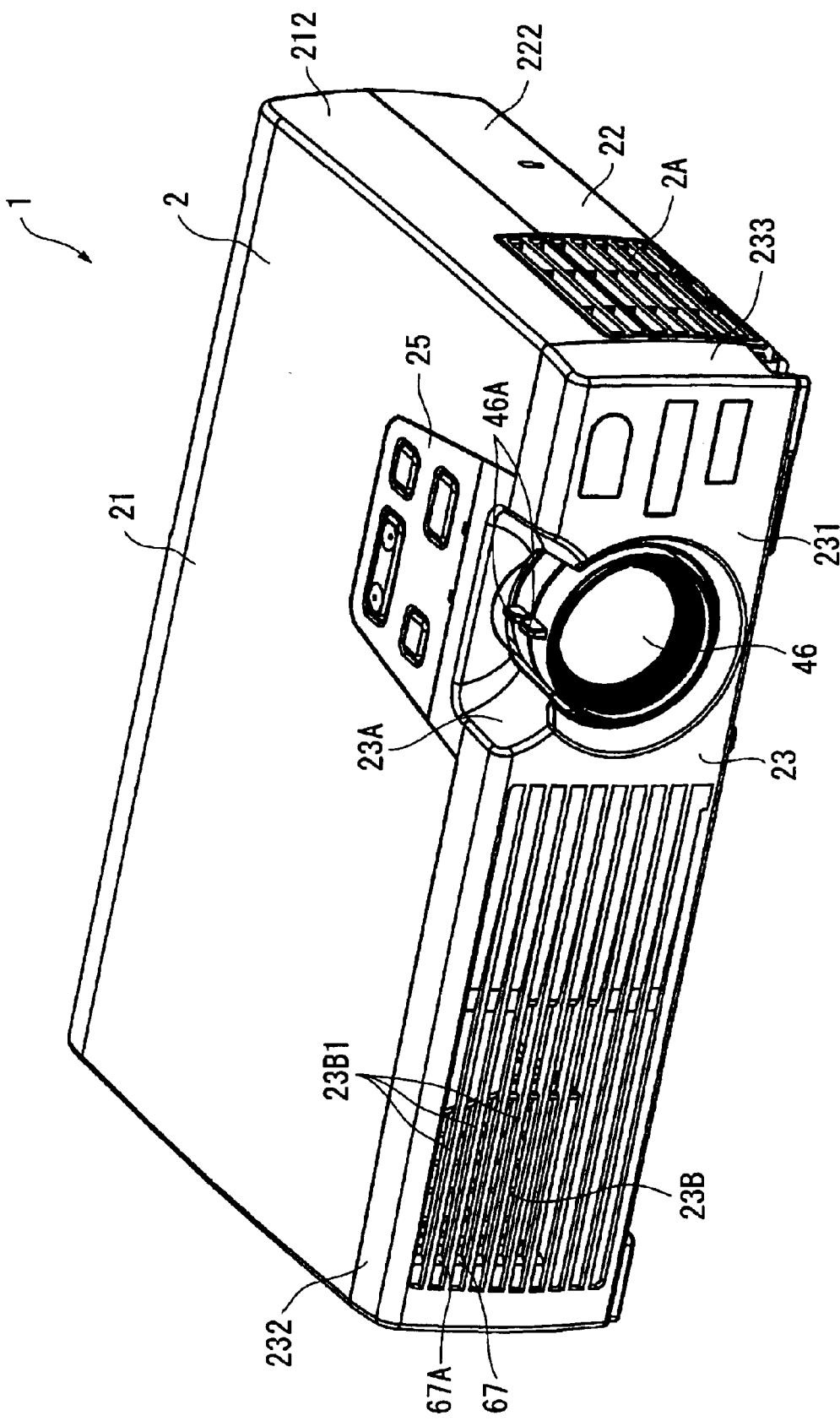
FIG. 1 is a perspective view of a projector seen from above according to an embodiment of the present invention.
Figure 2:
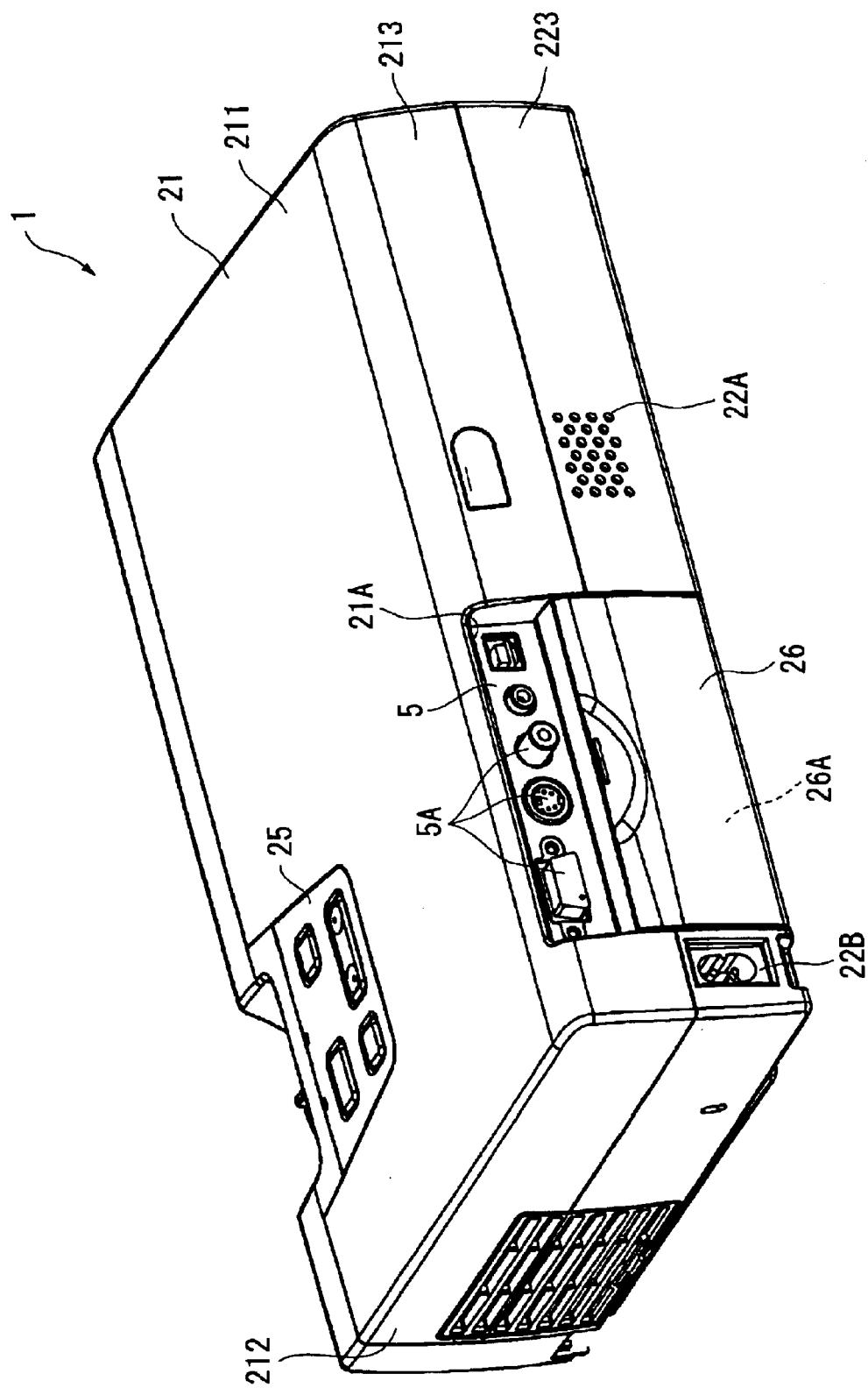
FIG. 2 is perspective view of the projector seen from back side.
Figure 3:
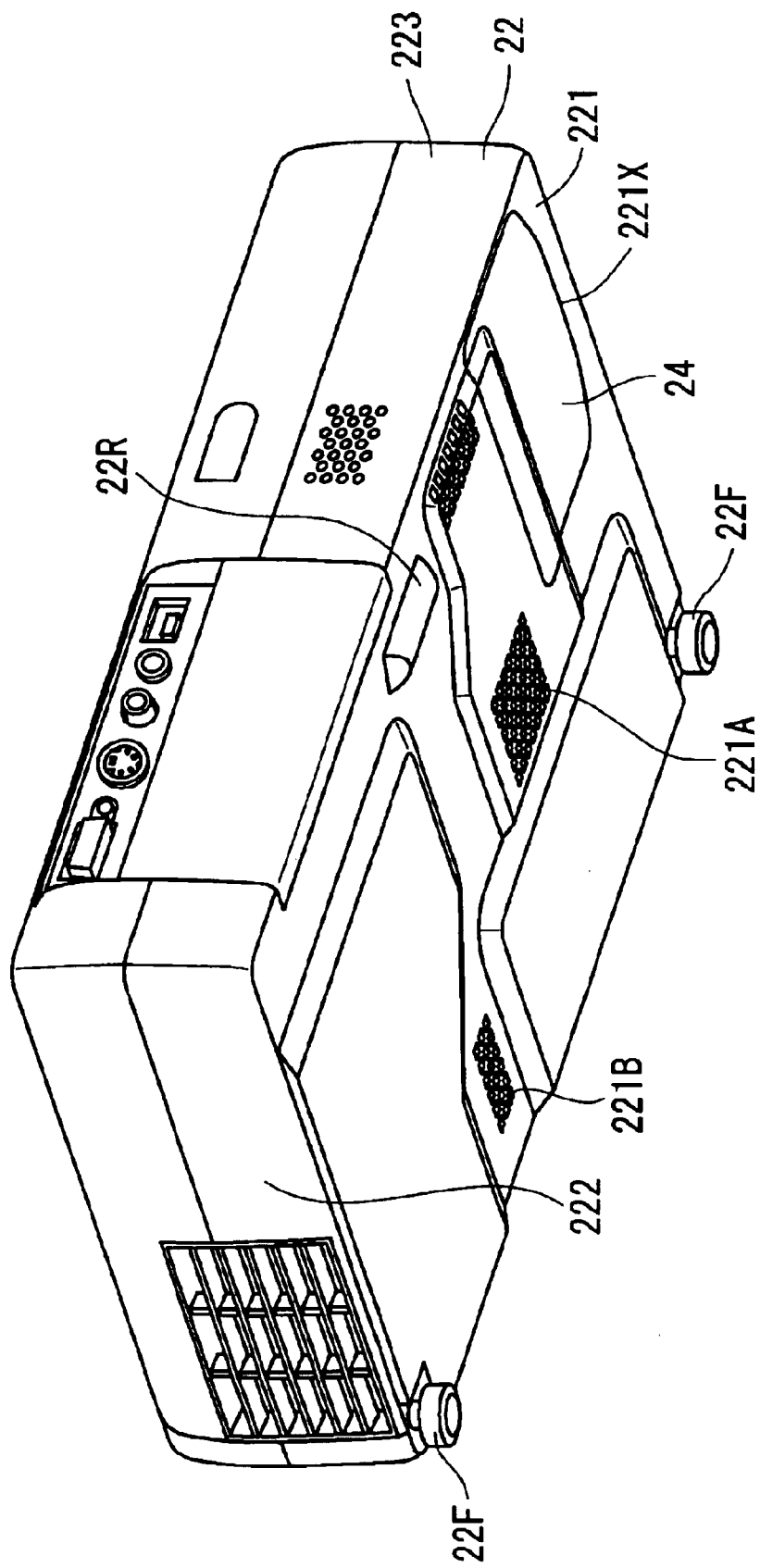
FIG. 3 is a perspective view of the projector seen from below.

FIG. 1 is a perspective view of a projector 1 seen from above according to an embodiment of the present invention. FIG. 2 is a perspective view of the projector 1 seen from back side. FIG. 3 is a perspective view of the projector 1 seen from below.

As shown in FIGS. 1 to 3, the projector 1 has an exterior case 2 of approximately rectangular parallelepiped.

The exterior case 2 is a casing for accommodating a body of the projector 1, which includes an upper case 21, a lower case 22 and a front case 23 spanning over the front side of the cases 21 and 22. The cases 21 to 23 are respectively made of synthetic resin material.

As shown in FIG. 2, the upper case 21 includes an upper portion 211, a side portion 212 and a rear portion 213 respectively constituting the top side, lateral side and rear side of the projector 1.

An operation panel 25 is provided on the front side of the upper portion 211.

A recess 21A spanning over the rear side of the upper portion 211 and the rear portion 213 is formed on the back side of the operation panel 25 on the upper case 21. A part of a circuit board 5 accommodated in the exterior case 2 is exposed to the outside from the recess 21A. The part of the circuit board 5 exposed to the outside is various connectors 5A constituting an interface. External devices are connected to the projector 1 through the connectors 5A.

As shown in FIG. 3, the lower case 22 includes a bottom portion 221, a side portion 222 and a rear portion 223 respectively constituting the bottom side, lateral side and rear side of the projector 1.

An opening 221X is formed on the bottom portion 221. A lamp cover 24 fitted to the rectangular opening 221X in a detachable manner. Further, inlet holes 221A and 221B for inhaling the cooling air from the outside are formed on the bottom portion 221.

A rear leg 22R constituting one of the legs of the projector 1 is formed approximately at the center on the rear side of the bottom portion 221. Further, front legs 22F also constituting the legs of the projector 1 are respectively provided on the right and left corners on the front side of the bottom portion 221. In other words, the projector 1 is supported on three points by the rear leg 22R and the two front legs 22F.

The two front legs 22F are vertically advanceable and retractable for adjusting the tilting (attitude of the projector 1) in front and rear directions and right and left directions to adjust position of the projected image.

As shown in FIG. 2, a remote controller storage 26 is formed on the rear portion 223 under the connector 5A. A remote controller 26A for remotely operating the projector 1 is accommodated in the remote controller storage 26.

Further, in FIG. 2, a speaker hole 22A is formed on the right of the remote controller storage 26 on the rear portion 223 and an inlet connector 22B is provided on the left of the remote controller storage 26.

As shown in FIG. 1, the front case 23 includes a front portion 231, a top portion 232 and a side portion 233 respectively constituting the front side, top side and lateral side of the projector 1.

An opening 23A spanning over the front portion 231 and the top portion 232 is formed on the front case 23. A projection lens 46 is disposed inside the exterior case 2 corresponding to the opening 23A. A part of the projection lens 46 is exposed to the outside from the opening 23A, so that zooming operation and focusing operation of the projection lens 46 can be manually conducted through a lever 46A as a part of the exposed portion.

An exhaust hole 23B is formed on the front portion 231 on a side opposite to the opening 23A. A duct 6B for guiding the air inside the projector 1 is provided inside the exhaust hole 23B and an exhaust hole 67A of the duct 6B opposes to the exhaust hole 23B. A plurality of horizontally arranged vanes 23B1 are formed on the exhaust hole 23B, the vanes 23B1 regulating the cooling air discharged from the exhaust hole of the exhaust duct 6B and blocking the light from the inside and the outside.

As shown in FIG. 1, an inlet hole 2A spanning over the side portion 212 of the upper case 21 and the side portion 222 of the lower case 22 is formed on the lateral side of the exterior case 2. A sirocco fun not illustrated in FIGS. 1 to 3 is provided inside the inlet hole 2A.

Figure 4:
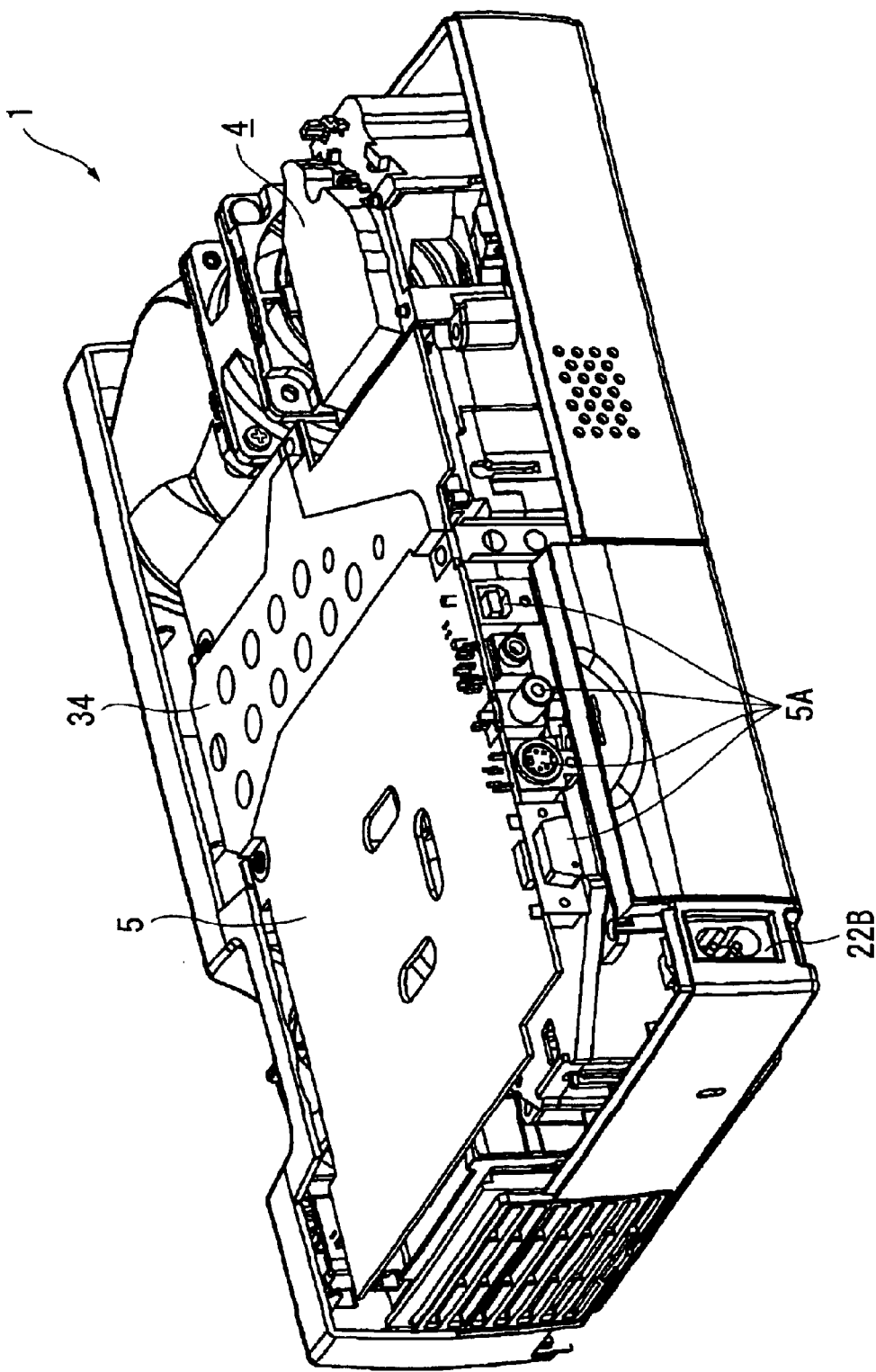
FIG. 4 is a perspective view showing the inside of the projector, which specifically shows the projector with upper case thereof constituting the projector being removed from the condition shown in FIG. 2.
Figure 5:
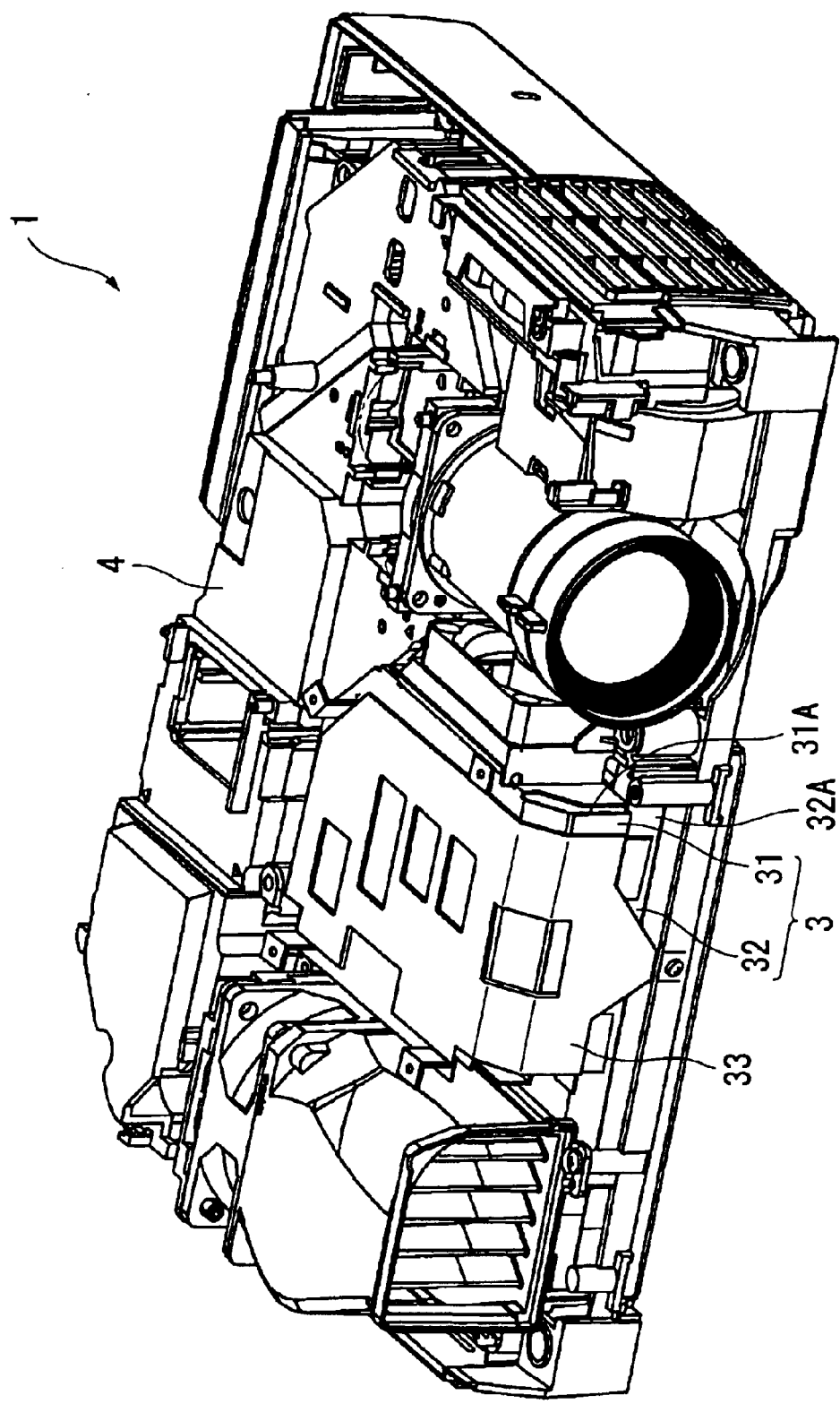
FIG. 5 is a perspective view showing the inside of the projector, which specifically shows the projector seen from front side with upper shield plate and circuit board constituting the projector being removed from the condition shown in FIG. 4.

FIGS. 4 and 5 are perspective views showing the inside of the projector 1.

Specifically, FIG. 4 is an illustration where the upper case 21 of the projector 1 is removed from the condition shown in FIG. 2. FIG. 5 is an illustration seen from the front side where the front case 23, an upper shield 34, and a circuit board 5 are removed from the condition shown in FIG. 4.

As shown in FIG. 4 or 5, the exterior case 2 is provided with a power source unit 3 disposed at approximately center of the front side of the projector l, an optical unit 4 having approximately planarly-viewed L-shape disposed on the rear side and right side of the power source unit 3, the circuit board 5 disposed above the units 3 and 4, and an exhaust duct unit 6 disposed on an end of the optical unit 4 toward the front side.

The power source unit 3 includes a power source 31 and a lamp driving circuit 32 disposed below the power source 31.

The power source 31 supplies the electric power from the outside to the lamp driving circuit 32, the circuit board 5 etc. through a not-illustrated power cable connected to the inlet connector 22B.

The lamp driving circuit 32 supplies electric power fed by the power source 31 to a light source lamp (not shown in FIGS. 4 and 5) constituting the optical unit 4, which is electrically connected to the light source lamp. The lamp driving circuit 32 is, for instance, wired to a not-illustrated board.

The power source 31 and the lamp driving circuit 32 are vertically arranged approximately in parallel, which occupy the space extending in right and left direction on the front side of the projector 1.

The power source 31 and the lamp driving circuit 32 are respectively covered with case members 31A and 32A having right and left sides being opened, the surface of the case members 31A and 32A being processed by plating, metal vacuum evaporation, foliation etc. The case members 31A and 32A prevent leakage of electromagnetic noise between the power source 31 and the lamp driving circuit 32 and works as a duct for introducing the cooling air.

The power source 31 and the lamp driving circuit 32 are covered with a metal lower shield 33 having rectangular opening, so that electromagnetic noise from the power source 31 and the lamp driving circuit 32 toward the outside can be prevented.

Figure 6:
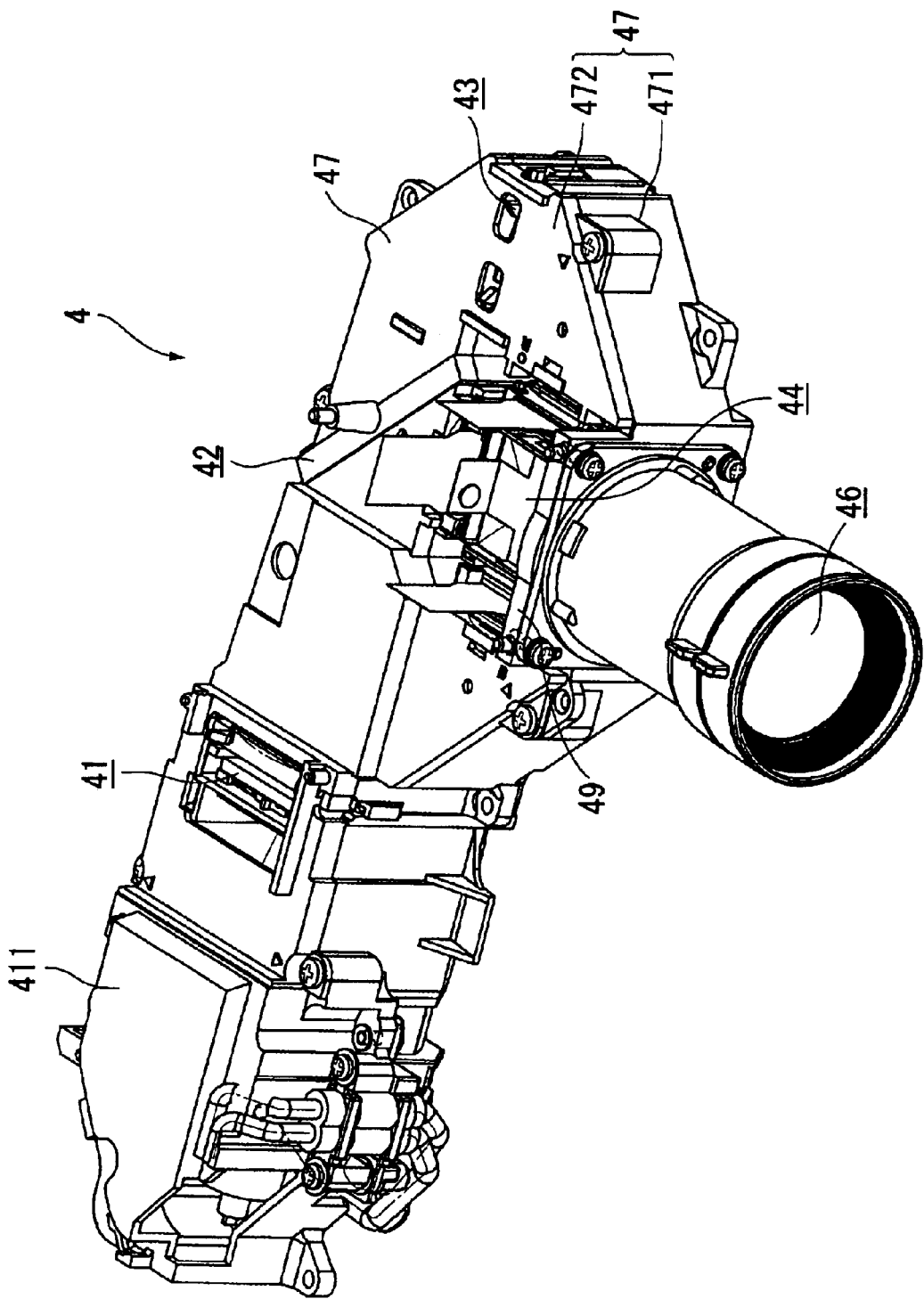
FIG. 6 is a perspective view showing an optical unit constituting the projector.

FIG. 6 is a perspective view showing an optical unit 4.

As shown in FIG. 6, the optical unit 4 optically processes the light beam irradiated by the non-illustrated light source lamp constituting a light source 411 to form an optical image in accordance with image information and enlarges and projects the optical image, which includes an integrator illuminating optical system 41, a color separating optical system 42, a relay optical system 42, an optical device 44, the projection lens 46 and a light guide 47 for accommodating the optical components 41 to 46. The details of the optical unit 4 will be described below.

Though not specifically shown in FIG. 4, the circuit board 5 is a single substrate installed with a controller including a CPU etc. and an interface including the various connectors 5A as a connection terminal, in which the controller controls the liquid crystal panel constituting the optical device 44 in accordance with the image information inputted through the connector 5A.

As shown in FIGS. 4 and 5, the circuit board 5 is provided on the upper side of the lower shield 33. Further the metallic upper shield 34 is disposed above the circuit board 5. The upper shield 34 and the lower shield 33 are mutually fixed with the circuit board 5 sandwiched therebetween. Accordingly, the leakage of the electromagnetic noise from the power source unit 3 and the circuit board 5 toward the outside can be prevented.

As shown in FIG. 4 or 5, the exhaust duct unit 6 exhausts the air staying within inside the projector 1 to the outside of the projector 1, which includes an axial-flow fan 6A and the exhaust duct 6B.

[2. Detailed Construction of Optical Unit]

Figure 7:
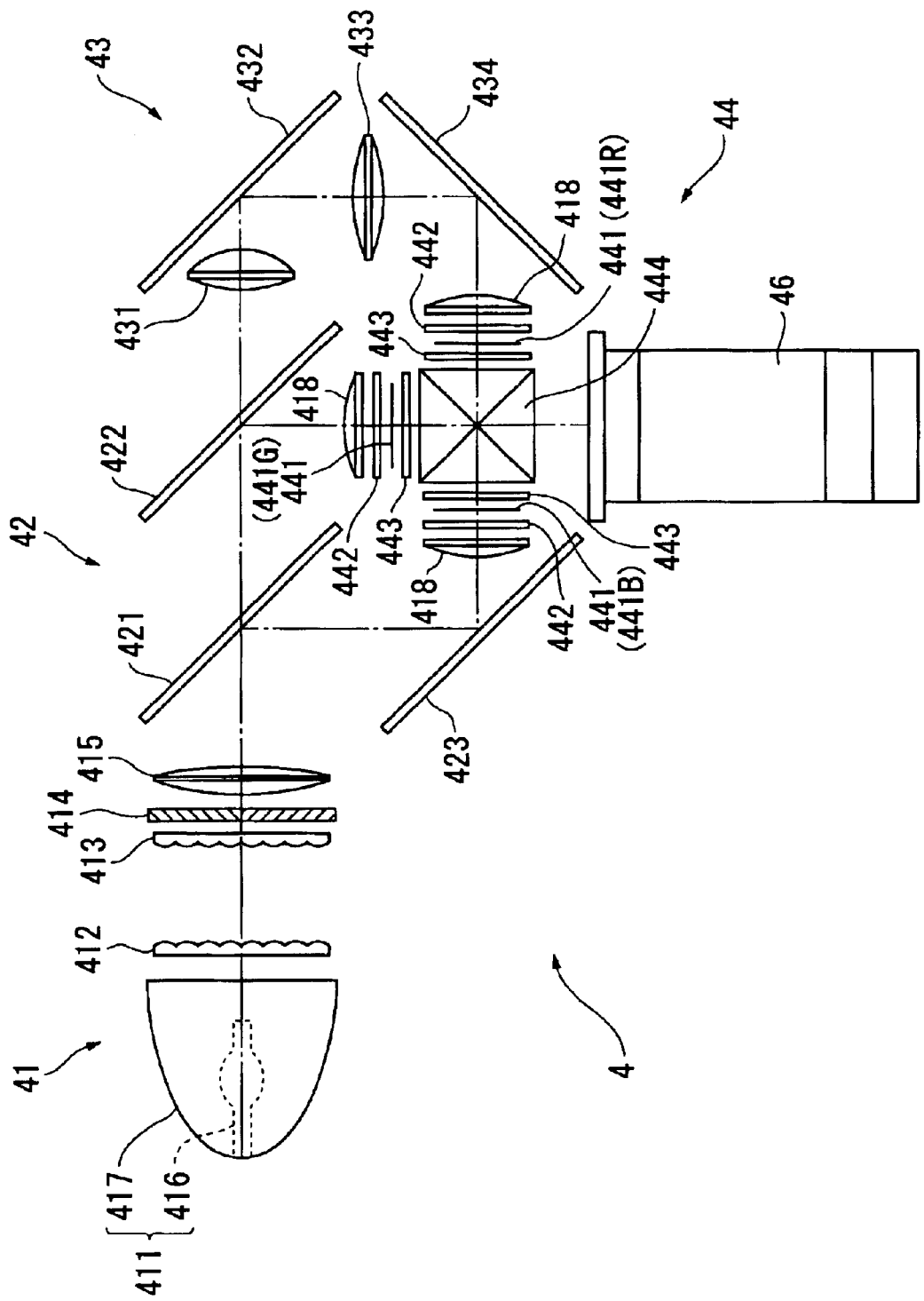
FIG. 7 is a plan view schematically showing the optical unit.

FIG. 7 is a plan view schematically showing the optical unit 4 shown in FIG. 6.

As shown in FIG. 7, the optical unit 4 includes the integrator illuminating optical system 41, the color separating optical system 42, the relay optical system 43, the optical device 44 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Figure 8:
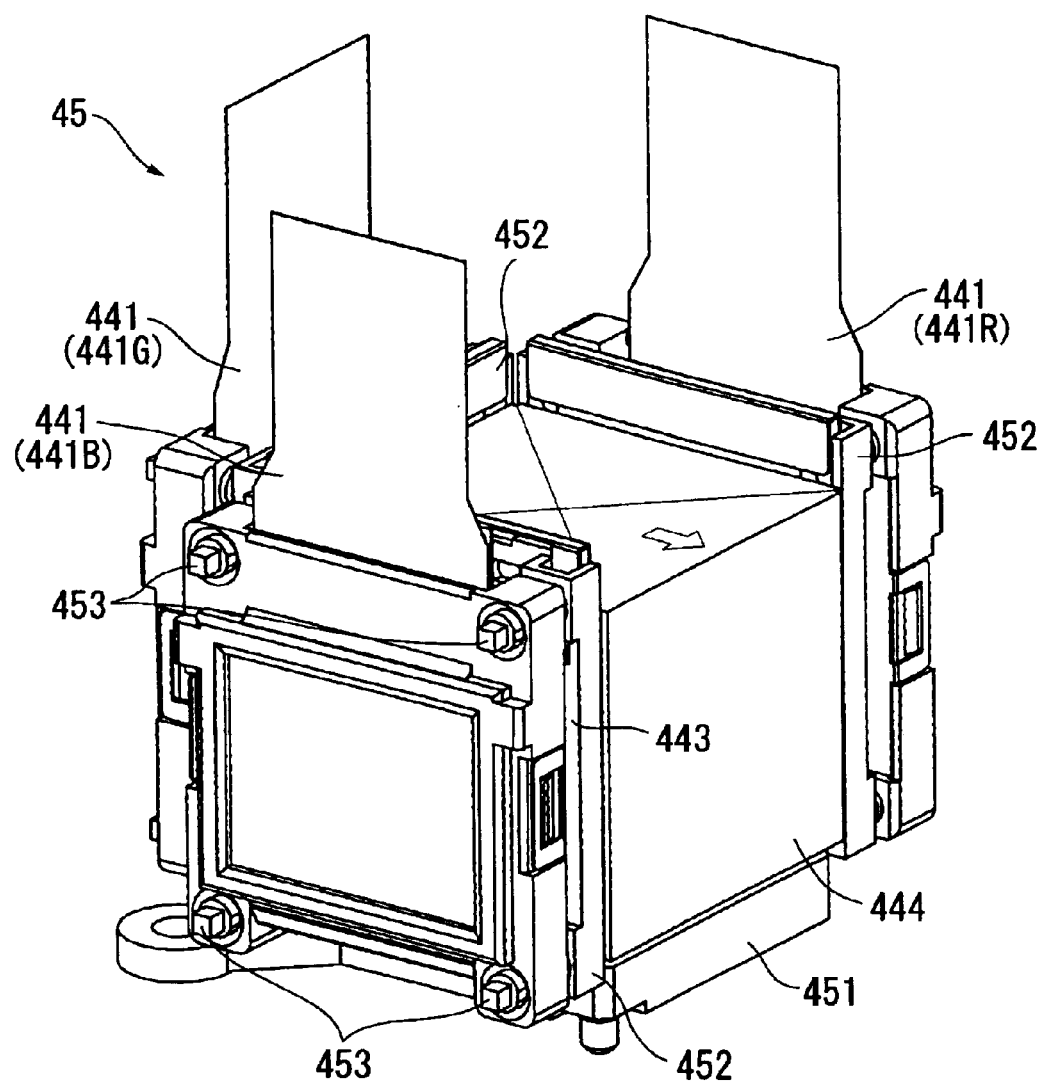
FIG. 8 is a perspective view showing an optical device body as a part of an optical device constituting the optical unit.

FIG. 8 is a perspective view showing the optical device body 45.

As shown in FIG. 8, the optical device body 45 has the cross dichroic prism 444, a metal base 451 for supporting the cross dichroic prism 444 from the lower side, a metal holding plate 452 for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate 452. A predetermined gap is secured between the holding plate 452 and the liquid crystal panel 441, so that the cooling air is flowed through the gap.

As shown in FIG. 7, the projection lens 46 enlarges and projects the color image combined by the cross dichroic prism 444 of the optical device 44.

The above-described optical systems 41 to 44 are accommodated in the light guide 47 made of synthetic resin as an optical component casing as shown in FIG. 6.

Though not specific illustration of the inside of the light guide 47 is omitted, as shown in FIG. 6, the light guide 47 has a lower light guide 471 having the groove for the respective optical components 412 to 415, 418, 421 to 423, 431 to 434 and 442 shown in FIG. 7 to be slidably fitted from the above, and a lid-shaped lower light guide 472 for closing the upper opening side of the lower light guide 471.

Further, as shown in FIG. 6, the light source 411 is accommodated on an end of the light guide 47 of approximately planarly-viewed L-shape, and the projection lens 46 is screwed and fixed on the other end through a head 49.

[3. Cooling Structure]

The projector 1 has a panel cooling system A for mainly cooling the liquid crystal panel 441, a light source cooling system B for mainly cooling the light source 411 and a power source cooling system C for mainly cooling the power source unit 3.

Figure 9:
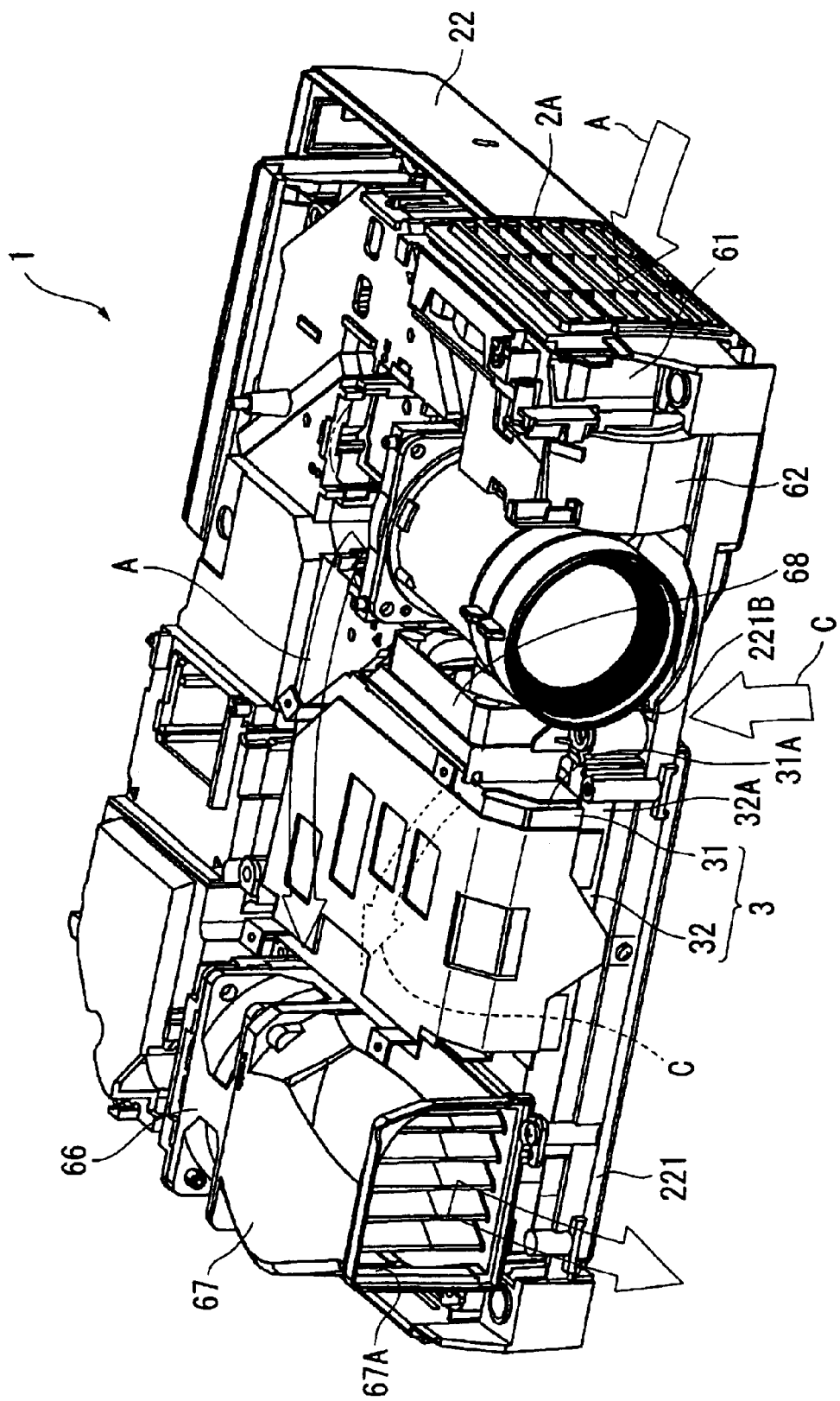
FIG. 9 is an illustration adding an arrow indicating a direction in which a cooling air flows to FIG. 5, which specifically shows the flow of the cooling air inside the projector including the power source cooling system.
Figure 10:
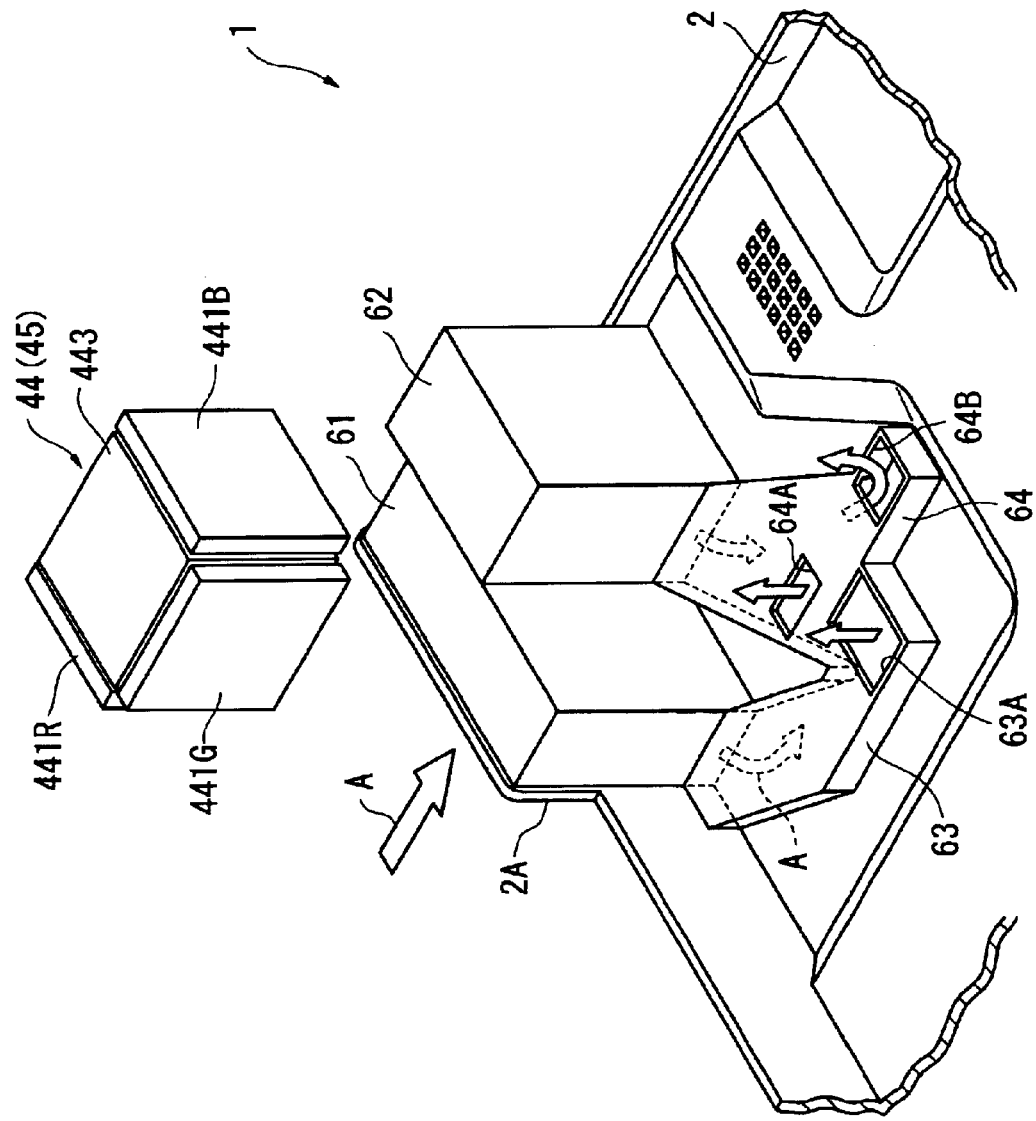
FIG. 10 is a perspective view schematically showing a structure of the lower side of the optical device for explaining a panel cooling system.
Figure 11:
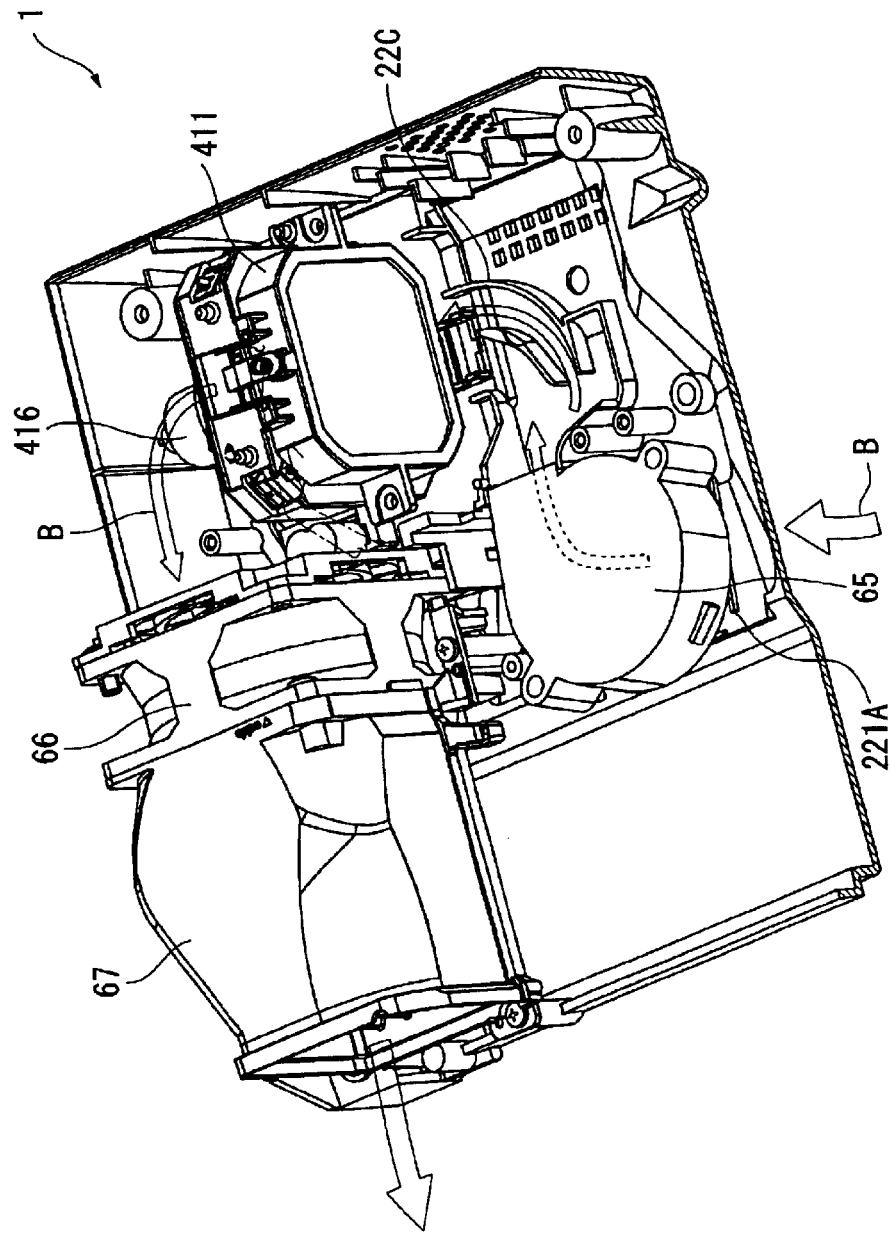
FIG. 11 is a perspective view showing a structure of the lower side of the power source unit and the light guide of the projector for explaining a light source cooling system.

FIG. 9 is an illustration identical with FIG. 5 adding arrows indicating airflow of the cooling air, which shows the flow of the cooling air inside the projector 1 including the power source cooling system C. FIG. 10 is a perspective view schematically showing the structure of the lower side of the optical device 44 for explaining the panel cooling system A. FIG. 11 is a perspective view showing the structure on the lower side of the power source unit 3 and the light guide 47 for explaining the light source cooling system B.

In FIG. 9, two sirocco fans 61 and 62 are disposed on the right side of the projection lens 46 in the panel cooling system A. Further, as shown in FIG. 10, ducts 63 and 64 respectively connected to the fans 61 and 62 are used in the panel cooing system A.

As shown in FIG. 10, the sirocco fans 61 and 62 inhale outside cooling air from the inlet hole 2A on a side of the exterior case 2 and discharge the inhaled cooling air to the ducts 63 and 64 respectively. Incidentally, the size of the sirocco fan 62 is greater than the sirocco fan 61.

The duct 63 guides the cooling air discharged by the sirocco fan 61 toward lower side of the optical device 44, where a rectangular opening 63A is formed at a position corresponding to the lower side of the liquid crystal panel 441G for green color light.

The duct 64 guides the cooling air discharged by the sirocco fan 62 to the lower side of the optical device 44, where rectangular openings 64A and 64B are respectively formed at a position corresponding to the lower side of the liquid crystal panels 441R and 441B respectively for red color light and blue color light.

Though not shown, an opening is formed on the bottom side of the lower light guide at a position corresponding to the openings 63A, 64A and 64B.

Accordingly, as shown in FIG. 10, the cooling air inhaled by the sirocco fans 61 and 62 of the panel cooling system A flows to cool the incident-side polarization plate and the irradiation-side polarization plate which is not illustrated in FIG. 10, in addition to the respective liquid crystal panels 441R, 441G and 441B.

Further, as shown in FIG. 9, the cooling air which has cooled the liquid crystal panels 441R, 441G and 441B upwardly from the lower side is drawn to the side of the axial-flow fan 6A on the left side viewed from the front side while cooling the lower side of the circuit board (not shown in FIG. 9) and is discharged from the exhaust hole on the front side of the exterior case (not shown in FIG. 9).

In FIG. 9, a sirocco fan 65 provided on the lower side of the power source unit 3, the axial-flow fan 6A and the exhaust duct 6B attached to the axial-flow fan 6A are used in the light source cooling system B.

The cooling air inhaled from the inlet hole 221A of the lower case 22 by the sirocco fan 65 flows along a guide 22C formed on the inner side of the bottom portion 221 of the lower case 22 and, thereafter, enters in the light source 411 to cool the light source lamp 416 to be flowed out toward the outside of the light source 411. The cooling air flowed out of the light source 411 is drawn by the axial-flow fan 6A in the same manner as the panel cooling system A to be discharged from the exhaust hole on the front side of the exterior case (not shown in FIG. 9) through the exhaust duct 6B.

In FIG. 9, an axial-flow fan 68 provided on the right side of the power source unit 3 is used in the power source cooling system C.

The cooling air inhaled by the axial-flow fan 68 from the inlet hole 221B formed on the bottom portion 221 of the lower case 22 flows from the right side to the left side viewed from the front side along the case members 31A and 32A while cooling the power source 31 and the lamp driving circuit 32. Subsequently, most of the cooling air is drawn by the axial-flow fan 66 as in the other cooling systems A and B and is discharged from the not-illustrated exhaust hole on the front side of the exterior case. Incidentally, a part of the air is directly discharged from the exhaust hole of the exterior case without being drawn by the axial-flow fan 66.

[4. Structure of Remote Controller Storage]

Figure 12:
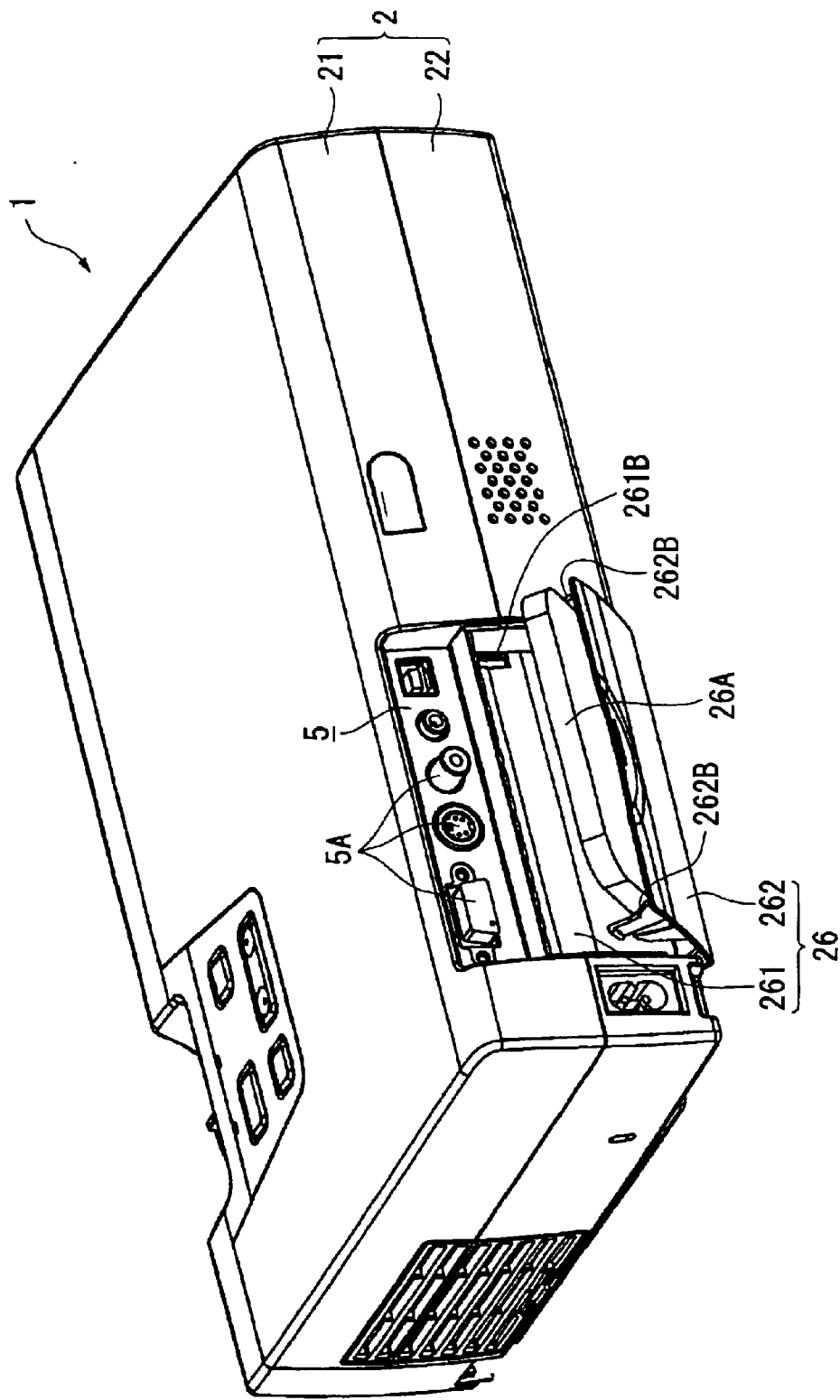
FIG. 12 is an illustration showing an arrangement for opening a remote controller storage and taking out a remote controller in FIG. 2.

FIG. 12 illustrates the remote controller storage 26 being opened and the remote controller 26A being taken out. FIG. 13 is a vertical cross section showing the pivot movement of the remote controller storage 26.

The remote controller 26A has operation buttons for turning on and off the power of the projector 1, playing and stopping the projection image and adjusting the volume, which can transmit a signal from a remote position to the controller of the circuit board 5, thereby conducting remote control.

The remote controller storage 26 has a storage body 261 as an accessory storage formed below the connector 5A constituting the interface of the circuit board 5 and a lid 262 covering the storage body 261 from the outside.

In FIG. 13, the storage body 261 is a hollow recess of approximately rectangular parallelepiped integrally formed on the lower case 2. Though partially hidden in the illustration, engaging recesses 261A dented in right and left direction are respectively formed on the right and left lower rear side of the storage body 261. Further, a rectangular engaging hole 261B is formed on the upper front side of the storage body 261.

As shown in FIGS. 12 and 13, the lid 262 is a lid component of L-shaped cross section pivotable relative to the storage body 261, which is made of transparent or translucent material such as polycarbonate, polymethyl methacrylate and poly-arylate so that the inside can be seen from the outside.

Engaging projections 262A having hemispheric distal end are formed on the right and left side of an end of the lid body 262 to be engaged with the engaging recess 261A of the storage body 261. The engaging recess 261A and the engaging projection 262A engage so that the lid 262 is supported by the lower case 22 in pivotable manner in the direction of arrow P in FIG. 13.

Engaging claws 262B to be engaged with the engaging hole 261B of the storage body 261 are provided on the other end of the lid 262. The two engaging claws 262B support the remote controller 26A accommodated therein in right and left directions to restrict and guide the movement of the remote controller 26A in right and left directions etc.

The engaging holes 261B and the engaging claws 262B are engaged to fit the lid 262 to the lower case 22.

When the lid 262 is pivotably moved clockwise in the direction indicated in the arrow P in FIG. 13, the space defined between the two engaging claws 262B emerges, so that the remote controller accommodated therein can be taken out. On the other hand, when the lid 262 is turned counterclockwise in the direction indicated in the arrow P in FIG. 13 to engage the engaging claw 262B with the engaging hole 261B, the above-described emerged space is closed, thereby securely accommodating the remote controller 26A inside the storage body 261.

[5. Advantage of Embodiment]

According to the present embodiment, following advantages can be obtained.

(1) Since the remote controller storage 26 is provided adjacent to the lower side of the connector 5A constituting the interface of the board 5, the conventional dead space can be effectively utilized as the remote controller storage 26. Accordingly, the remote controller 26A can be accommodated in the remote controller storage 26 without hindering size reduction, thereby securely carrying the remote controller 26A.

(2) Since the lid 262 is pivotably moved relative to the storage body 261, the remote controller 26A can be easily accommodated and taken out and the remote controller 26A can be securely prevented from falling off from the storage body 261.

(3) Since the lid 262 is made of transparent or translucent material, whether the remote controller 26A is accommodated in the storage body 261 or not can be checked from the outside and it is not necessary to turn the lid 262, so that the presence of the remote controller 26A can be easily checked, thus securely preventing failure to carry the remote controller 26A.

(4) Since the engaging recess 261A is formed on the storage body 261 and the hemispheric engaging projection 262A to be engaged with the engaging recess 261A is formed on the lid 262, the lid 262 can be securely pivotably moved with a relatively simple construction of engaging the engaging recess 261A and the engaging projection 262A.

(5) Since the engaging claw 262B is formed on the lid 262 and the engaging hole 261B to be engaged with the engaging claw 262B is formed on the storage body 261, the remote controller 26A accommodated inside the storage body 261 can be securely held.

(6) Since the engaging claw 262B for supporting the remote controller 26A from right and left sides are provided on both sides of the lid 262, the movement of the remote controller 26A can be securely restricted when the lid 262 is turned to be opened, thereby preventing fall-off and securely guiding the remote controller 26A to the storage body 261.

(7) Since the remote controller 26A that is especially likely to be forgotten to be carried is accommodated in the remote controller storage 26, the remote controller 26A can be securely carried and the smooth image projection can be conducted by remote control.

[6. Modification of Embodiment]

Incidentally, the scope of the present invention is not restricted to the above embodiment but includes other arrangement as long as an object of the present invention can be achieved, which includes the following modifications.

Though the accessory accommodated inside the accessory storage is a remote controller in the above embodiment, the accessory may be other accessory such as connection cable, earphone and battery. Alternatively, spare parts of relatively easily-wearing components may be stored in the accessory storage.

Though the controller 26A accommodated in the storage body 261 is accommodated and taken out by turning the lid 262, the remote controller 26A may be attached and detached by pushing the remote controller 26A itself. Alternatively, the remote controller 26A may be attached and detached while holding the both sides of the remote controller 26A. In short, the remote controller 26A may be accommodated and taken out in any manner as long as the remote controller storage 26 is disposed adjacent to the interface.

Though the lid 262 is made of transparent or translucent material in the above embodiment, the lid may be made of a material which is neither transparent nor translucent. According to such arrangement, a part of the lid 262 may be cut so that the inside of the storage body 261 can be seen, thereby easily checking the presence of the remote controller 26A from the outside.

When the lid 262 is made of a material which is neither transparent nor translucent, the presence of the remote controller 26A inside the storage body may be indicated by an attention-drawing function such as lighting a lamp when the lid 262 is closed.

Though the engaging recess 261A is formed on the storage body 261 and the engaging projection 262A is formed on the lid 262 in the aforesaid embodiment, the engaging projection may be formed on the storage body and the engaging recess may be formed on the lid.

Though a projector using three optical modulators is taken as an example in the above-described embodiment, the present invention can be applied to a projector having a single, two, or more than three optical modulators.

Though the liquid crystal panel is used as the optical modulator, an optical modulator other than liquid crystal such as a device using a micro-mirror may be used. Though a transmission-type optical modulator is used in the above-described embodiment, a reflection-type optical modulator may be used.

Though a front-type projector where the image is projected from a direction for viewing the screen is taken as an example in the above-described embodiment, the present invention may be applied to a rear-type projector where the image is projected from a direction opposite to the direction for viewing the screen.

Specific arrangement and configuration in implementing the present invention may be designed in any manner as long as an object of the present invention can be achieved.

Though the electronics exterior case of the present invention is used for a projector in the present invention, the exterior case may be used for various portable electronics such as a digital camera, digital video camera, game machine and mobile computer.

What is claimed is:

1. An electronics exterior case that accommodates a body of electronics and a board provided with a controller that controls the drive of the electronics, the board having a connection terminal exposed to the outside of the electronics exterior case for external electronics to be connected, the electronics exterior case comprising: a recess at a side thereof, in which the connection terminal is protruded, a space within the recess not occupied by the connection terminal defining an accessory storage capable of accommodating an accessory.

2. The electronics exterior case according to claim 1, the accessory storage comprising a lid pivotably supported by the electronics exterior case.

3. The electronics exterior case according to claim 2, wherein the lid is made of transparent or translucent material.

4. The electronics exterior case according to claim 3, wherein a hemispheric projection to be engaged with a recess formed on the electronics exterior case is formed on the lid, the lid being pivotably moved relative to the electronics exterior case by the engagement of the recess and the projection.

5. A projector, comprising:

an optical system that modulates a light beam irradiated by a light source in accordance with image information to form an optical image, and enlarges and projects the optical image;

a board installed with a controller that controls the operation of the optical system and connection terminal for external electronics to be connected;

an accessory; and

Image Page 2 an exterior case that accommodates the optical system and the board, the exterior case having a recess at a side thereof, in which the connection terminal is protruded, a space within the recess not occupied by the connection terminal defining an accessory storage capable of accommodating the accessory.

6. The projector according to claim 5, the accessory storage comprising a lid pivotably supported by the electronics exterior case.

7. The projector according to claim 6, wherein the lid is made of transparent or translucent material.

8. The projector according to claim 7, wherein a hemispheric projection to be engaged with a recess formed on the electronics exterior case is formed on the lid, the lid being pivotably moved relative to the electronics exterior case by the engagement of the recess and the projection.

9. The projector according to claim 5, wherein the accessory is a remote controller capable of transmitting a signal to the controller at a position remote from the projector.

10. An electronics exterior case that accommodates a body of electronics and a board provided with a controller that controls the drive of the electronics, the board having a connection terminal exposed to the outside of the electronics exterior case for external electronics to be connected, and an interface that transmits and receives a signal to and from the controller, the electronics exterior case comprising: an accessory storage, capable of accommodating an accessory, annexed to the body of the electronics at a position adjacent to the interface, the accessory storage comprising a lid pivotably supported by the electronics exterior case, wherein a hemispheric projection to be engaged with a recess formed on the electronics exterior case is formed on the lid, the lid being pivotably moved relative to the electronics exterior case by the engagement of the recess and the projection.

11. The electronics exterior case according to claim 10, wherein the lid is made of transparent or translucent material.

12. The electronics exterior case according to claim 10, wherein a hemispheric projection to be engaged with a recess formed on the electronics exterior case is formed on the lid, the lid being pivotably moved relative to the electronics exterior case by the engagement of the recess and the projection.

13. A projector, comprising:
- an optical system that modulates a light beam irradiated by a light source in accordance with image information to form an optical image, and enlarges and projects the optical image;
- a board installed with a controller than controls the operation of the optical system and a connection terminal for external electronics to be connected;
- an accessory; and
- an exterior case that accommodates the optical system and the board, the exterior case having an accessory storage capable of accommodating the accessory at a position adjacent to the connection terminal, the accessory storage comprising a lid pivotably supported by the electronics exterior case, wherein a hemispheric projection to be engaged with a recess formed on the electronics exterior case is formed on the lid, the lid being pivotably moved relative to the electronics exterior case by the engagement of the recess and the projection.

14. The projector according to claim 13, wherein the lid is made of transparent or translucent material.

15. The projector according to claim 13, wherein a hemispheric projection to be engaged with a recess formed on the electronics exterior case is formed on the lid, the lid being pivotably moved relative to the electronics exterior case by the engagement of the recess and the projection.

16. The projector according to claim 13, wherein the accessory is a remote controller capable of transmitting a signal to the controller at a position remote from the projector.

* * * * *